(12) United States Patent
Furukawa et al.

(10) Patent No.: US 11,146,746 B2
(45) Date of Patent: Oct. 12, 2021

(54) IMAGE PROCESSING DEVICE, IMAGE CAPTURING DEVICE, IMAGE PROCESSING METHOD, AND STORAGE MEDIUM

(71) Applicant: OLYMPUS CORPORATION, Hachioji (JP)

(72) Inventors: Eiji Furukawa, Saitama (JP); Shunichi Koga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 125 days.

(21) Appl. No.: 16/715,837

(22) Filed: Dec. 16, 2019

(65) Prior Publication Data
US 2020/0120272 A1 Apr. 16, 2020

Related U.S. Application Data

(63) Continuation of application No. PCT/JP2017/024579, filed on Jul. 5, 2017.

(51) Int. Cl.
*H04N 5/349* (2011.01)
*G06T 3/40* (2006.01)
(Continued)

(52) U.S. Cl.
CPC .......... *H04N 5/349* (2013.01); *G06T 3/4069* (2013.01); *H04N 5/23232* (2013.01); *H04N 5/23277* (2013.01); *H04N 5/357* (2013.01)

(58) Field of Classification Search
CPC . H04N 5/23232; H04N 5/23248–2329; H04N 5/349; G06T 3/4069
See application file for complete search history.

(56) References Cited

U.S. PATENT DOCUMENTS

2009/0033792 A1* 2/2009 Kano ..................... H04N 5/145
348/441
2009/0129704 A1 5/2009 Toda
(Continued)

FOREIGN PATENT DOCUMENTS

JP 2009237650 A 10/2009
JP 2010140460 A 6/2010
(Continued)

OTHER PUBLICATIONS

"Super-Resolution Considering Registration Error", General Lecture Collection of Forum on Information Technology, The Institute of Electronics, Information and Communication Engineers Information and Systems Society, Information Processing Society of Japan, 2006 5(3), pp. 63-64.
(Continued)

*Primary Examiner* — Paul M Berardesca
(74) *Attorney, Agent, or Firm* — Holtz, Holtz & Volek PC

(57) ABSTRACT

An image processing device includes one or more processors configured to: generate a high-resolution combined image by aligning the plurality of images with each other in a high-resolution image space based on an amount of displacement between the plurality of images, and combining the plurality of images; generate at least two low-resolution combined images by generating at least two groups each composed of at least two images by dividing the plurality of images in the time direction, aligning the at least two images in each of the groups with each other in a low-resolution image space based on the amount of displacement, and combining the at least two images through weighted addition; calculate, in each region, a feature quantity pertaining to a correlation between the generated at least two low-resolution combined images; and correct the high- (Continued)

resolution combined image based on the calculated feature quantity.

17 Claims, 12 Drawing Sheets

(51) Int. Cl.
*H04N 5/232* (2006.01)
*H04N 5/357* (2011.01)

(56) References Cited

U.S. PATENT DOCUMENTS

| | | | |
|---|---|---|---|
| 2009/0185760 A1* | 7/2009 | Okada | G06T 3/4069 |
| | | | 382/299 |
| 2010/0119176 A1 | 5/2010 | Ichihashi et al. | |
| 2013/0308877 A1* | 11/2013 | Tezuka | G06T 3/4007 |
| | | | 382/300 |
| 2015/0319363 A1 | 11/2015 | Furukawa | |
| 2017/0024856 A1 | 1/2017 | Kajimura | |
| 2018/0077360 A1 | 3/2018 | Furukawa et al. | |
| 2018/0225810 A1 | 8/2018 | Kajimura | |

FOREIGN PATENT DOCUMENTS

| | | |
|---|---|---|
| JP | 2011199786 A | 10/2011 |
| JP | 2015192199 A | 11/2015 |
| JP | 2015204599 A | 11/2015 |
| WO | 2007142109 A1 | 12/2007 |
| WO | 2015145856 A1 | 10/2015 |
| WO | 2015159581 A1 | 10/2015 |
| WO | 2017064807 A1 | 4/2017 |
| WO | 2019008692 A1 | 1/2019 |

OTHER PUBLICATIONS

International Search Report (ISR) dated Oct. 3, 2017 (and English translation thereof) issued in International Application No. PCT/JP2017/024579.

International Search Report (ISR) dated Sep. 26, 2017 (and English translation thereof) issued in International Application No. PCT/JP2017/024578.

Written Opinion (WO) dated Oct. 3, 2017 issued in International Application No. PCT/JP2017/024579.

Written Opinion (WO) dated Sep. 26, 2017 issued in International Application No. PCT/JP2017/024578.

Related U.S. Appl. No. 16/715,583; Title: Image Processing Device, Image Capturing Device, Image Processing Method, and Storage Medium; First Named Inventor: Eiji Furukawa filed Dec. 16, 2019.

* cited by examiner

| G00 | G01 | G02 | G03 | G04 |
|---|---|---|---|---|
| G10 | G11 | G12 | G13 | G14 |
| G20 | G21 | G22 | G23 | G24 |
| G30 | G31 | G32 | G33 | G34 |
| G40 | G41 | G42 | G43 | G44 |

LOW-RESOLUTION COMBINED IMAGE 1

| g00 | g01 | g02 | g03 | g04 |
|---|---|---|---|---|
| g10 | g11 | g12 | g13 | g14 |
| g20 | g21 | g22 | g23 | g24 |
| g30 | g31 | g32 | g33 | g34 |
| g40 | g41 | g42 | g43 | g44 |

LOW-RESOLUTION COMBINED IMAGE 2

FIG. 9

FIRST FILTER

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

SECOND FILTER

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

IMAGE PROCESSING DEVICE, IMAGE CAPTURING DEVICE, IMAGE PROCESSING METHOD, AND STORAGE MEDIUM

CROSS-REFERENCE TO RELATED APPLICATIONS

This is a continuation of International Application PCT/JP2017/024579, with an international filing date of Jul. 5, 2017, which is hereby incorporated by reference herein in its entirety.

TECHNICAL FIELD

The present invention relates to image processing devices, image capturing devices, image processing methods, image processing programs, and storage media and in particular relates to a technique for combining a higher-resolution image from a plurality of images.

BACKGROUND ART

As a technique for increasing the resolution of an image, there is a well-known method in which a plurality of images are acquired while an image capturing element is being displaced in a direction orthogonal to the optical axis thereof, and with the amounts of displacement taken into consideration, the pixels of the plurality of images are arranged in a high-resolution image space having a higher resolution than the plurality of images, thereby generating a high-resolution combined image (refer to, for example, PTL 1). Acquired images of a subject such as a fine pattern suffer folding noise (aliasing). Because the above-described technique allows folding noise to be removed and high-frequency components to be reproduced by combining a plurality of images that are displaced relative to one another, the technique can produce a resolution-increasing effect.

However, the above-described technique has a problem in that an artifact such as multiple images occurs in a region in which the subject has moved. As means for solving such a problem, the technique in PTL 1 could be applied. In this technique, a degree of similarity between a plurality of images is calculated, and the combining ratio between the images is controlled on the basis of this degree of similarity. For example, one of the plurality of images is set as a base image, and the images other than the base image are set as reference images; the difference between the base image and each of the reference images is calculated for each region; the degree of similarity between both the images is determined from the amount of difference; the combining ratio of the reference image is increased in regions having a high degree of similarity; and the combining ratio of the reference image is decreased in regions having a low degree of similarity, thus preventing the occurrence of an artifact resulting from motion or displacement of the subject.

CITATION LIST

Patent Literature

{PTL 1}
Japanese Unexamined Patent Application, Publication No. 2011-199786

SUMMARY OF INVENTION

A first aspect of the present invention is an image processing device including: one or more processors comprising hardware, the one or more processors being configured to: generate a high-resolution combined image by aligning the plurality of time-series images with each other in a high-resolution image space having a resolution higher than the plurality of time-series images based on an amount of displacement between the plurality of time-series images, and combining the plurality of time-series images; generate at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition; calculate, in each region, a feature quantity pertaining to a correlation between the generated at least two low-resolution combined images; and correct the high-resolution combined image based on the calculated feature quantity.

A second aspect of the present invention is an image capturing device including: an image acquisition unit that is configured to acquire a plurality of time-series images; and one of the above-described image processing devices for processing the acquired plurality of time-series images.

A third aspect of the present invention is an image processing method including: generating, by one ore more processors, a high-resolution combined image by aligning the plurality of time-series images with each other in a high-resolution image space having a resolution higher than the plurality of time-series images based on an amount of displacement between the plurality of time-series images, and combining the plurality of time-series images; generating, by the one ore more processors, at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition; calculating, by the one ore more processors, in each region, a feature quantity pertaining to a correlation between the generated at least two low-resolution combined images; and correcting, by the one ore more processors, the high-resolution combined image based on the calculated feature quantity.

A fourth aspect of the present invention is a non-transitory computer-readable storage medium storing an image processing program for causing a computer to execute: generating a high-resolution combined image by aligning the plurality of time-series images with each other in a high-resolution image space having a resolution higher than the plurality of time-series images based on an amount of displacement between the plurality of time-series images, and combining the plurality of time-series images; generating at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition; calculating, in each region, a feature quantity pertaining to a correlation between the generated at least two low-resolution combined images; and correcting the high-resolution combined image based on the calculated feature quantity.

BRIEF DESCRIPTION OF DRAWINGS

FIG. 3 is a diagram depicting an example of a high-resolution combined image for each channel generated by a high-resolution combining unit.

FIG. 4 a diagram for illustrating a method for generating two low-resolution combined images with a low-resolution combining unit.

FIG. 5 a diagram for illustrating a method for calculating a feature quantity with a feature-quantity calculation unit, showing portions of the two low-resolution combined images.

FIG. 9 is a diagram depicting examples of a first filter and a second filter in a filter processing unit in FIG. 8.

DESCRIPTION OF EMBODIMENTS

An image processing device 1 according to an embodiment of the present invention and an image capturing device 10 including the same will now be described with reference to the drawings.

Figure 1:
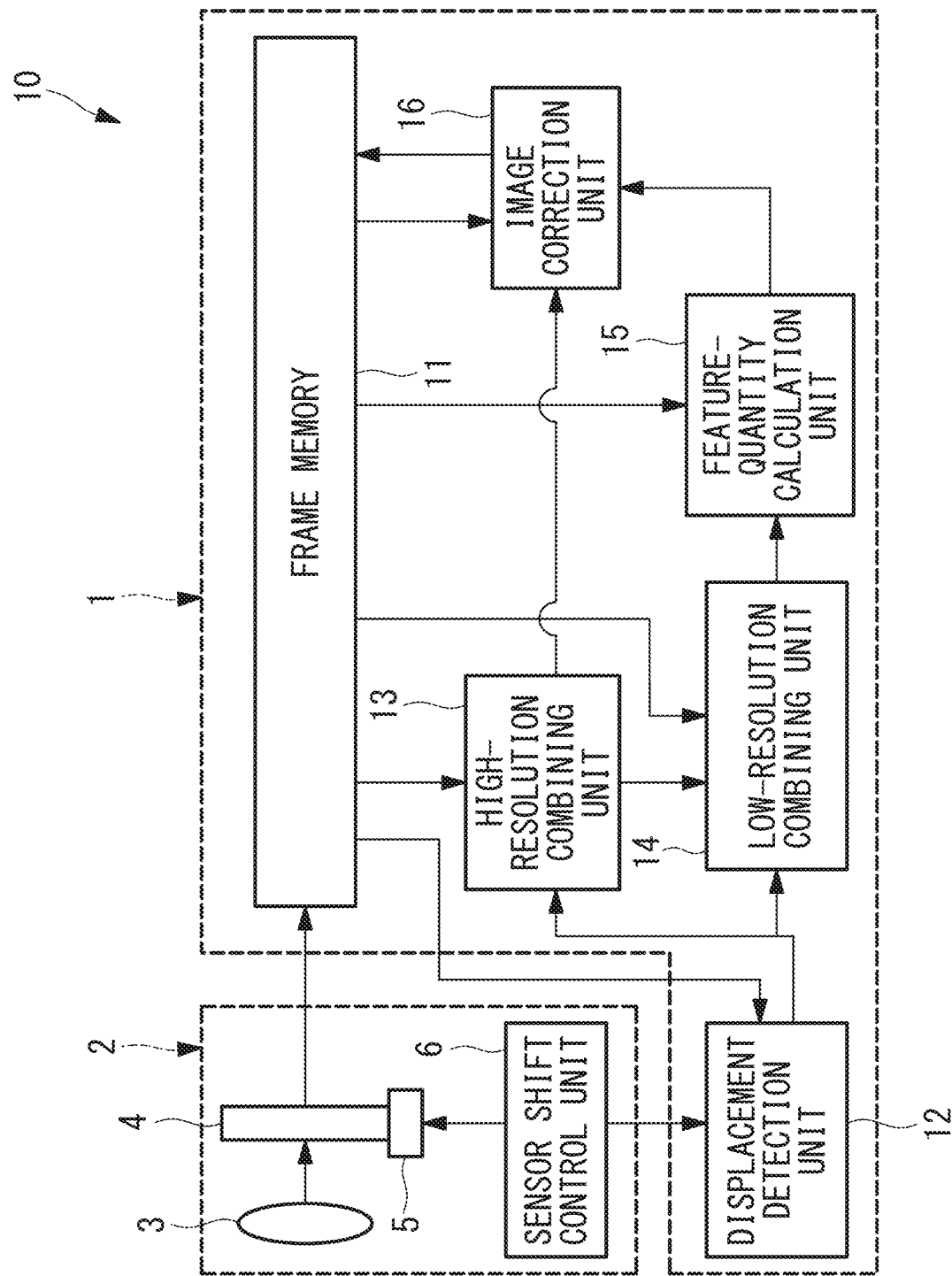
FIG. 1 is a block diagram showing the overall structure of an image processing device and an image capturing device according to an embodiment of the present invention.

The image capturing device 10 according to this embodiment is, for example, a digital video camera, a digital still camera, or the like for acquiring and recording static images and dynamic images. FIG. 1 shows a block configuration of the image capturing device 10. As shown in FIG. 1, the image capturing device 10 includes: an image acquisition unit 2 that captures images of a subject and that acquires the images; and the image processing device 1 that processes the plurality of images acquired by the image acquisition unit 2 and that generates an image having a higher resolution than the plurality of images.

The image acquisition unit 2 includes, for example: an image capturing lens 3 for forming an optical image by focusing light from the subject; an image capturing element 4 for acquiring an image by capturing the optical image formed by the image capturing lens 3; a sensor shift mechanism 5 for shifting the position of the image capturing element 4 in the pixel arrangement directions; and a sensor shift control unit 6 for controlling the direction of shift and the amount of shift of the image capturing element 4 performed by the sensor shift mechanism 5.

The image capturing element 4 has many pixels two-dimensionally arranged along a horizontal direction and a vertical direction that are orthogonal to each other. The image capturing element 4 has a so-called Bayer array structure in which four types of color filters including R, Gr, Gb, and B are arranged in a two-row and two-column format, and one color filter corresponds to one pixel. The image capturing element 4 acquires a plurality of time-series images by performing image acquisition multiple times. The acquired images are output from the image capturing element 4 to a frame memory 11 in the image processing device 1 and are stored in the frame memory 11 in a time-series manner.

The sensor shift mechanism 5 includes an actuator (not shown in the figure) capable of shifting the image capturing element 4 in units of sub-pixels in the horizontal direction and the vertical direction of the image capturing element 4.

The sensor shift control unit 6 controls the direction of shift and the amount of shift of the image capturing element 4 by controlling the actuator of the sensor shift mechanism 5. The sensor shift control unit 6 shifts the image capturing element 4 by controlling the sensor shift mechanism 5 while the image capturing element 4 is performing image acquisition multiple times and outputs, to a displacement detection unit 12 in the image processing device 1, sensor shift control information including information about the directions of shift and the amounts of shift of the image capturing element 4.

Figure 2:
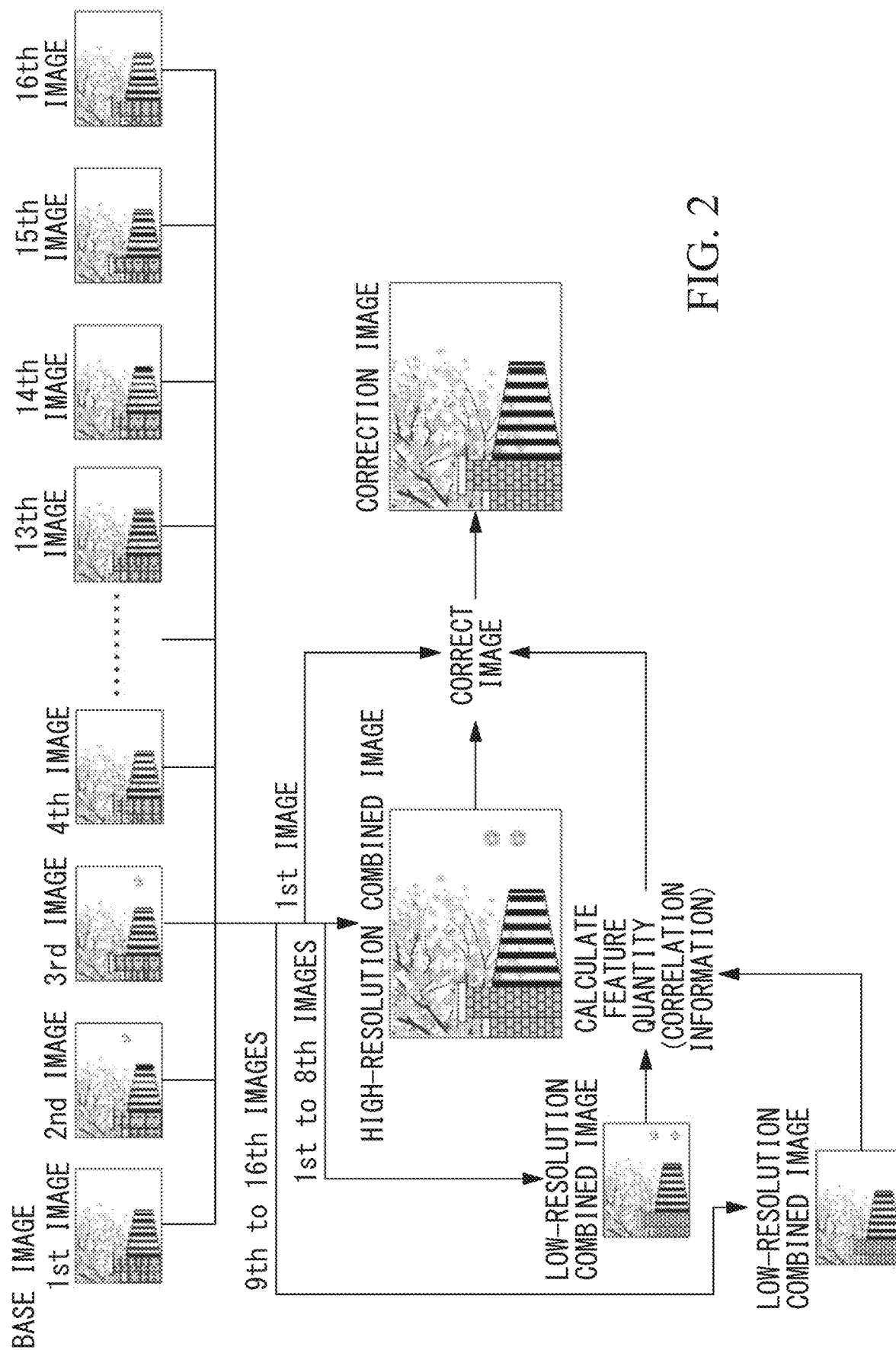
FIG. 2 is a schematic diagram for illustrating image processing with the image processing device in FIG. 1.

The image processing device 1 includes: the frame memory 11; the displacement detection unit 12; a high-resolution combining unit 13; a low-resolution combining unit 14; a feature-quantity calculation unit 15; and an image correction unit 16. FIG. 2 shows processes for image processing in the image processing device 1.

The frame memory 11 stores, in a time-series manner, a plurality of images input from the image acquisition unit 2. At this time, the frame memory 11 stores, as a base image, the one image that has been input first and stores, as a reference image, at least one image that has been input thereafter. The frame memory 11 can be accessed by the image acquisition unit 2 and any of the units 12, 13, 14, 15, and 16 in the image processing device 1.

The displacement detection unit 12 detects the amount of displacement between the base image and the reference image on the basis of the sensor shift control information from the sensor shift control unit 6 and outputs the detected amount of displacement to the high-resolution combining unit 13 and the low-resolution combining unit 14.

The high-resolution combining unit 13 reads the base image and the reference image from the frame memory 11. Next, while aligning the base image and the reference image on the basis of the amount of displacement from the displacement detection unit 12, the high-resolution combining unit 13 arranges the base image and the reference image in a high-resolution image space for each of the color channels (R, Gr, Gb, and B).

Figure 3:
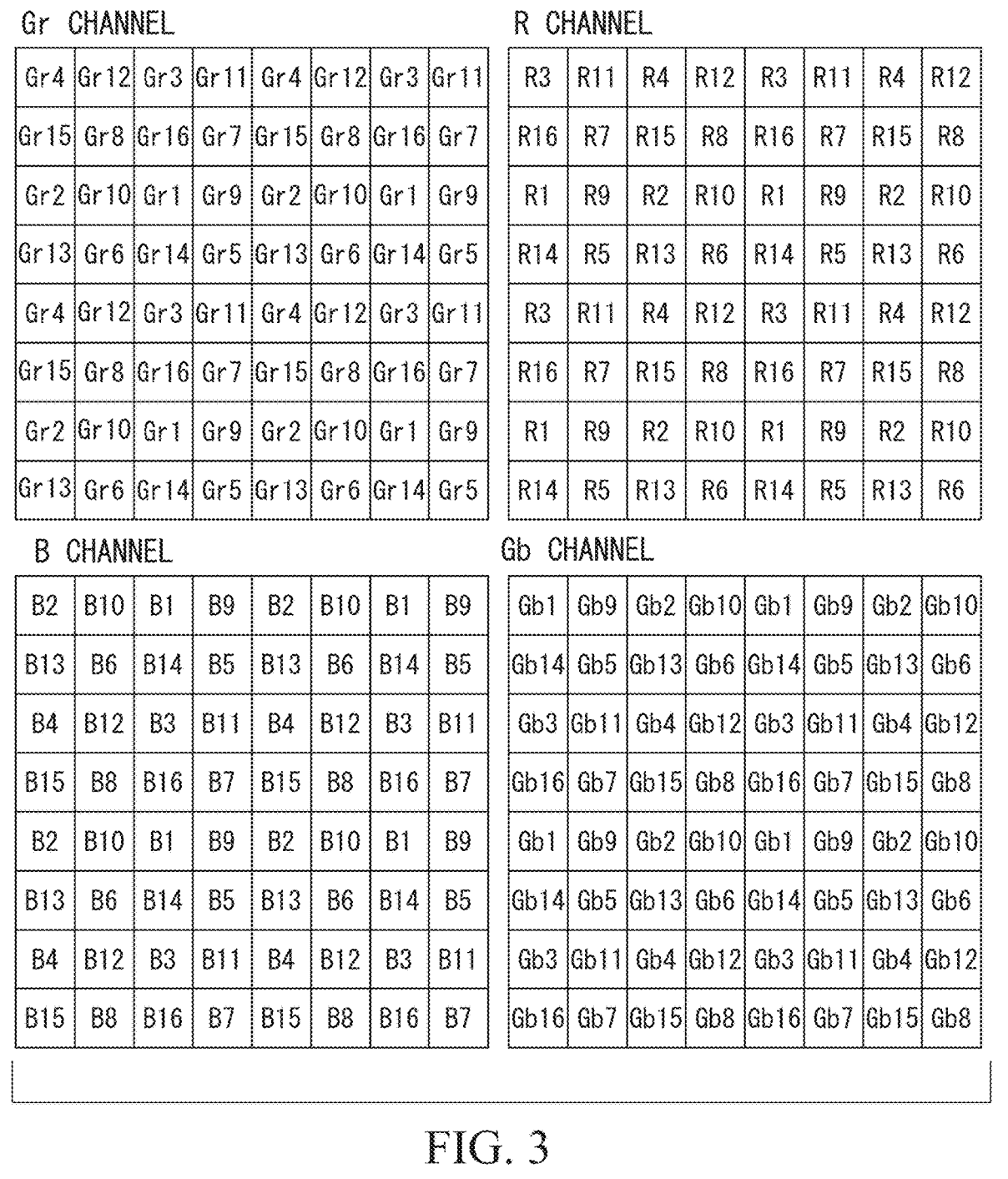

FIG. 3 shows the process of generating a high-resolution combined image for each color channel from one base image and 16 reference images. As shown in the left side of FIG. 3, the high-resolution combining unit 13 arranges each pixel of the base image in the high-resolution image spaces having a higher resolution than the base image and then arranges each pixel of each of the reference images in the high-resolution image spaces on the basis of the amount of displacement of the reference image relative to the base image. In the example in FIG. 3, the high-resolution image spaces have a resolution four-times as high as that of the base image and the reference images, and thus, the high-resolution combining unit 13 aligns each pixel on the basis of twice the amount of displacement (amount of shift). In the case where a pixel of the same color as that of the pixel to be arranged is already arranged when pixels are to be arranged, the pixel need not be arranged newly, or the pixel value may be updated by arithmetically averaging the pixel to be arranged and the pixel that is already arranged.

Figure 4:
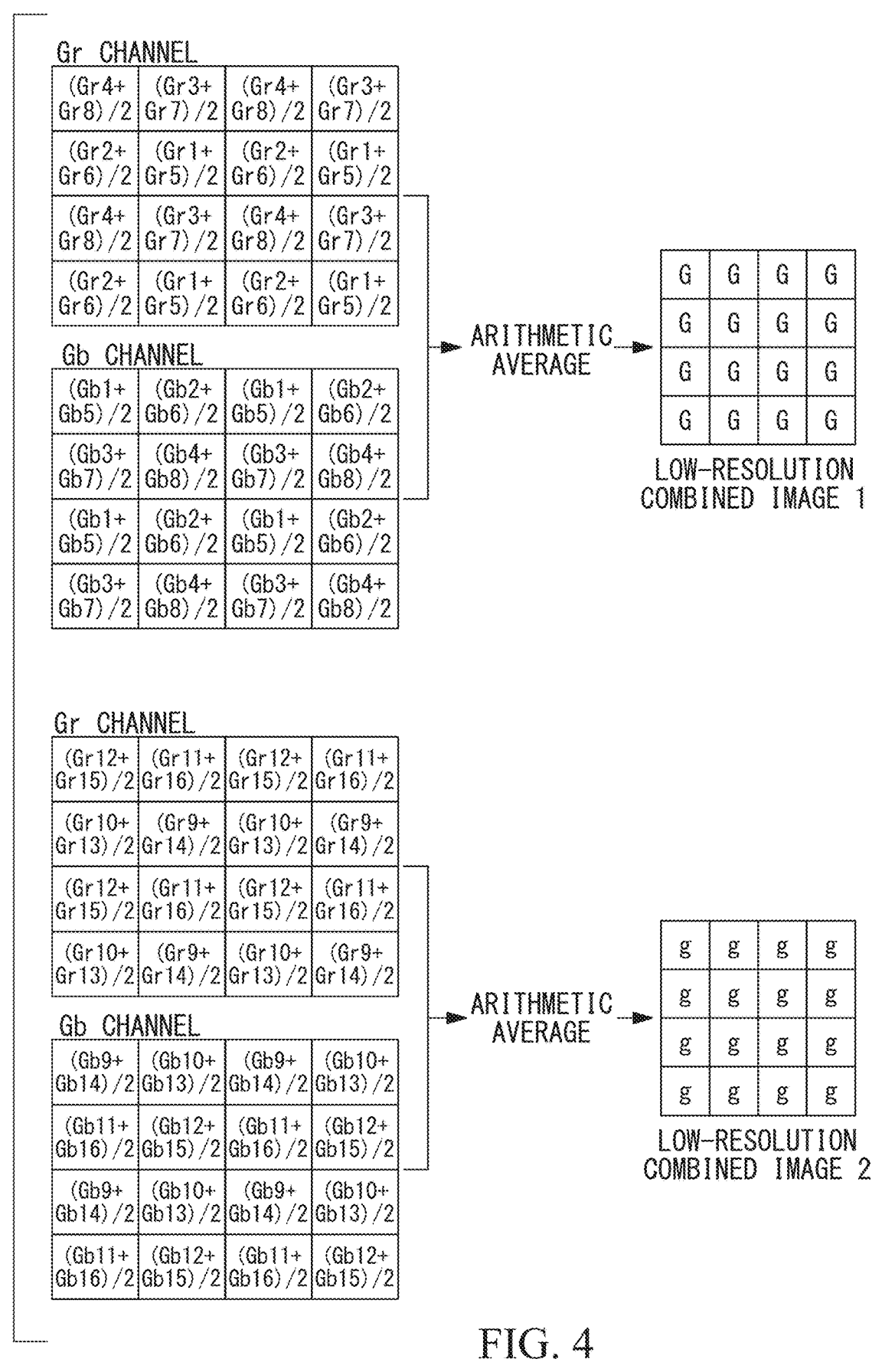

In FIG. 3, the numbers serving as suffixes of R, Gr, Gb, and B indicate the order of image acquisition. More specifically, suffix number "1" indicates that the pixel is a pixel of the base image acquired as the first image, and suffix numbers "2" to "16" indicate that the pixels are pixels of the reference images acquired as the second to 16th images. FIGS. 3 and 4 show pixel arrangements in the case where the position of the image capturing element 4 is controlled as follows by the sensor shift control unit 6 when images are acquired with the image capturing element 4.

1: Base image,
2: 1 pixel in the horizontal direction and 0 pixels in the vertical direction relative to the base image,
3: 0 pixels in the horizontal direction and 1 pixel in the vertical direction relative to the base image,
4: 1 pixel in the horizontal direction and 1 pixel in the vertical direction relative to the base image,
5: 0.5 pixels in the horizontal direction and 0.5 pixels in the vertical direction relative to the base image,
6: 1.5 pixels in the horizontal direction and 0.5 pixels in the vertical direction relative to the base image,
7: 0.5 pixels in the horizontal direction and 1.5 pixels in the vertical direction relative to the base image,
8: 1.5 pixels in the horizontal direction and 1.5 pixels in the vertical direction relative to the base image,
9: 0.5 pixels in the horizontal direction and 0 pixels in the vertical direction relative to the base image,
10: 1.5 pixels in the horizontal direction and 0 pixels in the vertical direction relative to the base image,
11: 0.5 pixels in the horizontal direction and 1 pixel in the vertical direction relative to the base image,
12: 1.5 pixels in the horizontal direction and 1 pixel in the vertical direction relative to the base image,
13: 1 pixel in the horizontal direction and 0.5 pixels in the vertical direction relative to the base image,
14: 0 pixels in the horizontal direction and 0.5 pixels in the vertical direction relative to the base image,
15: 1 pixel in the horizontal direction and 1.5 pixels in the vertical direction relative to the base image, and
16: 0 pixels in the horizontal direction and 1.5 pixels in the vertical direction relative to the base image.

In the example in FIG. 3, all regions of each of the high-resolution combined images are filled with pixels of some images. However, depending on the direction of shift and the amount of shift of the image capturing element 4, empty regions in which no image pixels are arranged may occur between pixels of the high-resolution combined images after all pixels of the base image and the reference images have been arranged. In such a case, the high-resolution combining unit 13 performs the process of filling the empty regions by interpolation. The interpolation method may be, for example, direction determination interpolation in consideration of an edge direction by using surrounding pixels that have been arranged, or may be an interpolation method for copying the closest pixel.

The low-resolution combining unit 14 reads the base image and the reference images from the frame memory 11. Next, the low-resolution combining unit 14 forms two groups each composed of at least two time-series images by dividing the read images into two groups in the time direction. Next, the low-resolution combining unit 14 generates, from the at least two images in each of the groups, low-resolution combined images for the Gr channel and the Gb channel, which include a large amount of luminance information and are appropriate for the calculation of feature quantities. More specifically, while aligning the at least two images on the basis of the amount of displacement from the displacement detection unit 12, the low-resolution combining unit 14 arranges the at least two images in low-resolution image spaces for the Gr channel and the Gb channel, thereby generating low-resolution combined images for the Gr channel and the Gb channel.

FIG. 4 illustrates the process of generating low-resolution combined images for the Gr and Gb channels from the first to eighth images and the process of generating low-resolution combined images for the Gr and Gb channels from the ninth to 16th images. As shown in the left side of FIG. 4, the low-resolution combining unit 14 arranges each pixel of the first image in the low-resolution image spaces each having a resolution equal to or lower than the resolution of the first to eighth images and then arranges each pixel of each of the second to eighth images in the low-resolution image spaces on the basis of the amounts of displacement of the second to eighth images relative to the first image.

FIG. 4 shows, as one example, a case where each of the low-resolution image spaces has a resolution equal to the resolution of the base image and the reference images. Therefore, the low-resolution combining unit 14 aligns each pixel on the basis of one-times the amount of displacement (amount of shift).

Because each of the low-resolution image spaces has a resolution equal to or lower than the resolution of the base image and the reference images, a plurality of pixels derived from different images are aligned at the same position in the low-resolution image space. In the case where a pixel of the same color as that of the pixel to be arranged is already arranged, the low-resolution combining unit 14 updates the pixel value by weighted addition of the pixel value of the pixel to be arranged and the pixel value of the pixel that is already arranged. By doing so, the low-resolution combined images are generated by weighted addition of the plurality of images.

FIG. 4 shows, as an example of weighted addition, arithmetic averaging in which two pixel values are added with each pixel value weighted by 0.5. For example, the value of the upper left pixel of the low-resolution combined image for the Gr channel is the arithmetically averaged value of the pixels of the fourth image and the eighth image, and the value of the upper left pixel of the low-resolution combined image for the Gb channel is the arithmetically averaged value of the pixels of the first image and the fifth image. In weighted addition, two pixel values may be weighted by coefficients different from each other.

In the same manner, the low-resolution combining unit 14 arranges each pixel of the ninth image in the low-resolution image spaces and then arranges each pixel of each of the tenth to 16th images in the low-resolution image spaces on the basis of the amounts of displacement of the tenth to 16th images relative to the ninth image, thereby generating another set of low-resolution combined images for the Gr channel and the Gb channel.

Next, the low-resolution combining unit 14 generates a low-resolution combined image for the G channel by arithmetically averaging the low-resolution combined image for the Gr channel and the low-resolution combined image for the Gb channel that have been formed by combining the first to eighth images. In the same manner, the low-resolution combining unit 14 generates another low-resolution combined image for the G channel by arithmetically averaging the low-resolution combined image for the Gr channel and the low-resolution combined image for the Gb channel that have been formed by combining the ninth to 16th images. The two generated low-resolution combined images for the G channel are output from the low-resolution combining unit 14 to the feature-quantity calculation unit 15.

In the example in FIG. 4, when the pixel position, of a pixel of each image, in each of the low-resolution image spaces is to be calculated from the amount of displacement, an amount of displacement of 0.5 pixels or less is rounded down, and values larger than 0.5 pixels are rounded up. However, the decimal places of the amount of displacement may be rounded off.

In addition, in the example in FIG. 4, all regions of each of the low-resolution combined images are filled with pixels of some image. However, depending on the direction of shift and the amount of shift of the image capturing element 4, the low-resolution combined image may also have empty regions in which no image pixels are arranged. In such a case, the empty regions of the low-resolution combined image are filled with pixels by interpolation in the same manner as interpolation performed for the empty regions in the high-resolution combined images.

The feature-quantity calculation unit 15 calculates, as a feature quantity, an SAD (sum of absolute difference) representing the correlation between two low-resolution combined images by using the two low-resolution combined images input from the low-resolution combining unit 14. More specifically, the feature-quantity calculation unit 15 sets, at the same positions in the two low-resolution combined images, blocks that each have a predetermined size (e.g., 5×5 pixels) and that each have one pixel of interest at the center, as shown in FIG. 5, and calculates the SAD between the set blocks as a feature quantity of the pixel of interest. The feature-quantity calculation unit 15 sets the pixels at all positions in the two low-resolution combined images as pixels of interest in order and repeats the calculation of a feature quantity. Therefore, the same number of feature quantities as the number of pixels of each of the low-resolution combined images are calculated.

The feature quantity is not limited to the SAD but may be an arbitrary index value representing the correlation between regions in the two low-resolution combined images, such as an SSD (sum of squared difference).

The spatial resolution of the distribution of feature quantities (the number of feature quantities) in each of the low-resolution image spaces is lower than the resolution of each of the high-resolution image spaces (the number of pixels in the high-resolution image space). The feature-quantity calculation unit 15 performs the process of extending the resolution of the distribution of feature quantities to the resolution of the high-resolution image space. As the method for extending the resolution of the distribution of feature quantities, a method for increasing the number of feature quantities by the nearest-neighbor method, the bilinear method, the bicubic method, or the like is used as in image enlargement processing. By doing so, the number of feature quantities is increased to the same number as the number of pixels of the high-resolution combined image, and a feature quantity for each pixel of the high-resolution combined image is obtained. The calculated feature quantities are output from the feature-quantity calculation unit 15 to the image correction unit 16.

Alternatively, each of the two low-resolution combined images may be enlarged so as to have a resolution equal to the resolution of the high-resolution combined image, and then the feature quantity for each pixel in the two resolution-increased low-resolution combined images may be calculated.

Figure 6:
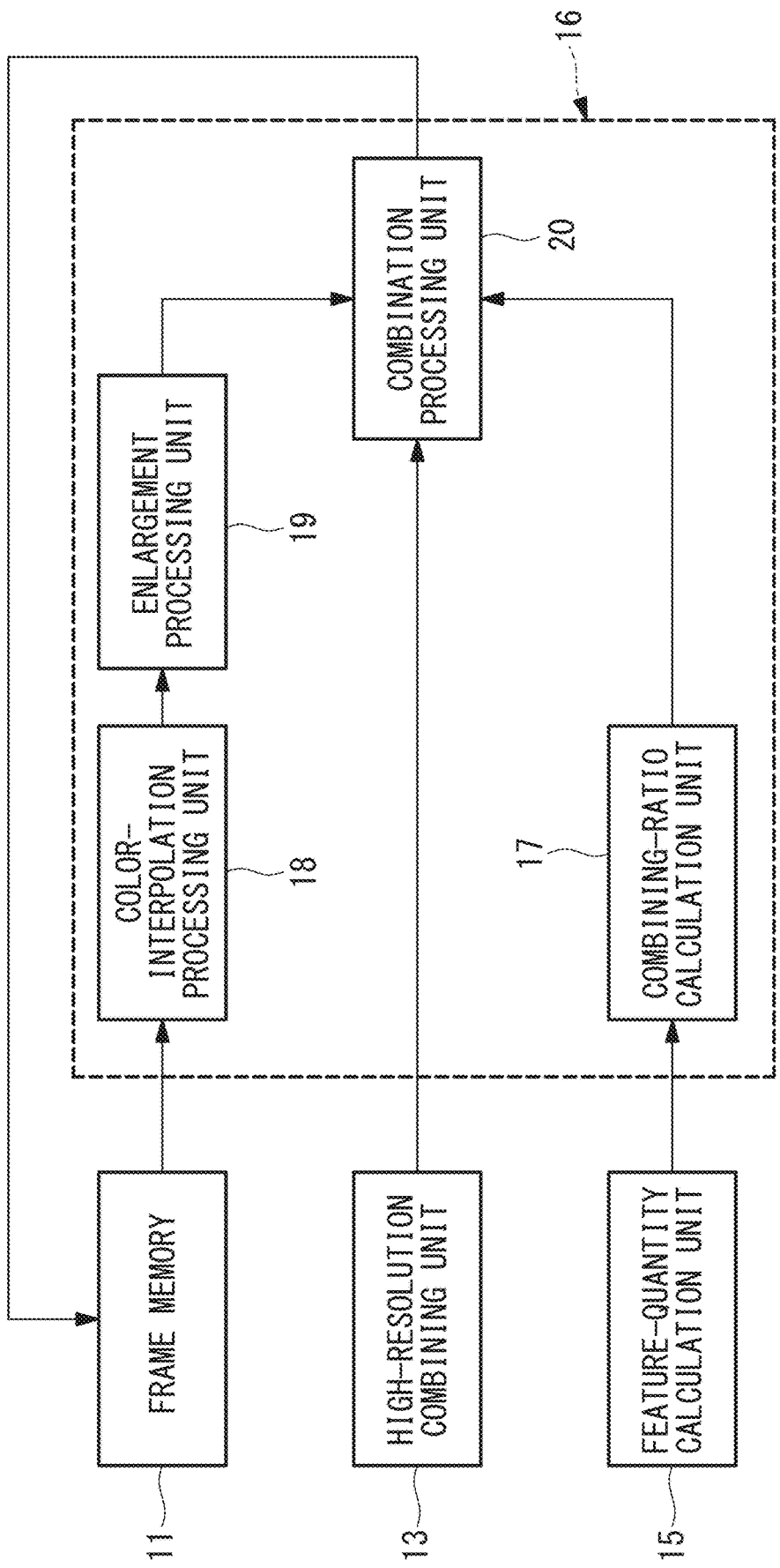
FIG. 6 is a block diagram showing the internal configuration of an image correction unit of the image processing device in FIG. 1.

As shown in FIG. 6, the image correction unit 16 includes: a combining-ratio calculation unit 17 for calculating combining ratios on the basis of feature quantities input from the feature-quantity calculation unit 15; a color-interpolation processing unit 18 that applies de-mosaicking processing to RAW data of the base image stored in the frame memory 11 and that colorizes the base image; an enlargement processing unit 19 for enlarging the colorized base image to the same image size as the size of a combined image; and a combination processing unit 20 for generating a correction image by combining, according to the combining ratios calculated by the combining-ratio calculation unit 17, the high-resolution combined images generated by the high-resolution combining unit 13 and the enlarged base image (enlarged image).

Figure 7:
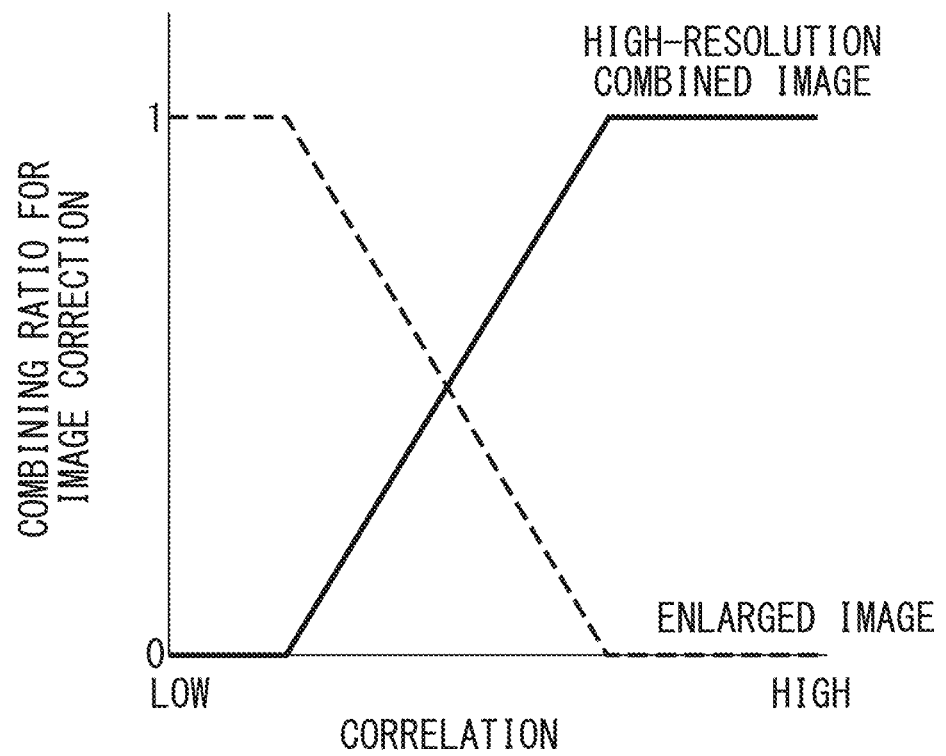
FIG. 7 is a diagram depicting one example of a map that is used when a combining ratio is calculated from a correlation in a combining-ratio calculation unit in FIG. 6.

The combining-ratio calculation unit 17 includes a map in which correlations (SAD) serving as feature quantities are associated with combining ratios. FIG. 7 shows one example of the map. In this manner, in the map, the higher the correlation, the higher the combining ratios of the high-resolution combined images, and the lower the correlation, the higher the combining ratio of the base image. The combining-ratio calculation unit 17 reads, from the map, a combining ratio corresponding to a feature quantity of each pixel of the high-resolution combined images and calculates a combining ratio between each of the high-resolution combined images and the base image at each pixel.

The correlation is low (the SAD is high) in a region including a moving subject like a ball (moving region) in the image in FIG. 2. In such a low-correlation region, pixel alignment fails, leading to an artifact having an unnatural pattern in a high-resolution combined image that has been produced on the basis of the Bayer-array pixels. Given that, as shown in FIG. 7, the lower the correlation, the higher the combining ratio of the enlarged base image in the combination between the enlarged base image and the high-resolution combined images, thereby correcting the high-resolution combined images by means of the combination processing unit 20 so as to reduce artifacts.

On the other hand, a high-correlation (small-SAD) region is a region in which alignment is successful and hence the resolution-increasing effect by combining a plurality of images is high. Therefore, in such a high-correlation region, the combining ratios of the high-resolution combined images are high in the combination between the enlarged base image and the high-resolution combined images.

Next, the operation of the image processing device 1 according to this embodiment with the above-described structure and the image capturing device 10 will be described.

The image capturing device 10 acquires 16 images by causing the image capturing element 4 to acquire, 16 times in a row, a subject image formed by the image capturing lens 3. At this time, as a result of the image capturing element 4 performing image acquisition while the sensor shift mechanism 5 is shifting the image capturing element 4 on the basis of a command signal from the sensor shift control unit 6, 16 time-series images having the subject positions displaced relative to one another are acquired. The acquired 16 images are stored in the frame memory 11.

Thereafter, an image processing method according to one embodiment of the present invention is performed by using the 16 images stored in the frame memory 11.

First of all, the displacement detection unit 12 detects the amount of displacement between the base image and each of the reference images, and the amount of displacement is input to the high-resolution combining unit 13 and the low-resolution combining unit 14. In addition, the base image and the reference images are read from the frame memory 11 into the high-resolution combining unit 13 and the low-resolution combining unit 14.

In the high-resolution combining unit 13, each pixel of the 16 images is arranged in the high-resolution image space for each color channel while being aligned on the basis of the amounts of displacement, thereby generating a high-resolution combined image for each color channel (high-resolution combination step).

In line with the generation of the high-resolution combined images, in the low-resolution combining unit 14, a low-resolution combined image for the Gr channel is generated as a result of the Gr channels of the first to eighth images being added to each other by weighted addition, and a low-resolution combined image for the Gb channel is generated as a result of the Gb channels of the first to eighth images being added to each other by weighted addition (low-resolution combination step). Next, a low-resolution combined image for the G channel is generated by arithmetically averaging the low-resolution combined image for the Gr channel and the low-resolution combined image for the Gb channel with each other.

In addition, in the low-resolution combining unit 14, a low-resolution combined image for the Gr channel is generated as a result of the Gr channels of the ninth to 16th images being added to each other by weighted-addition, and a low-resolution combined image for the Gb channel is generated as a result of the Gb channels of the ninth to 16th images being added to each other by weighted addition (low-resolution combination step). Next, another low-resolution combined image for the G channel is generated by arithmetically averaging the low-resolution combined image for the Gr channel and the low-resolution combined image for the Gb channel with each other.

Next, in the feature-quantity calculation unit 15, the correlation between the two low-resolution combined images is calculated as the feature quantity of each pixel of the two low-resolution combined images for the G channel (feature-quantity calculation step).

Next, in the combining-ratio calculation unit 17 of the image correction unit 16, the combining ratio for each pixel of the high-resolution combined images is calculated on the basis of the correlation. In addition, in the color-interpolation processing unit 18 of the image correction unit 16, de-mosaicking processing is applied to the base image that has been read from the frame memory 11, and in the enlargement processing unit 19, the base image is enlarged to the same image size as the size of each of the high-resolution combined images. Then, in the combination processing unit 20, the high-resolution combined images for the four color channels and the enlarged base image sent from the high-resolution combining unit 13 are combined on the basis of the combining ratios calculated in the combining-ratio calculation unit 17. By doing so, a combined image in which an artifact in the high-resolution combined images has been corrected is generated (image correction step).

In this case, individual images acquired by the image acquisition unit 2 can suffer folding noise (aliasing) in a subject region such as a fine pattern. According to this embodiment, the subject positions in the 16 images that are acquired while the position of the image capturing element 4 is being shifted are displaced by 0.5 to 3.5 pixels relative to one another. By arranging the pixels of the 16 images in the high-resolution image spaces while the pixels are being aligned according to the amounts of displacement of the subject, not only can folding noise be removed but also high-resolution combined images with increased resolution can be obtained.

On the other hand, in the case where any of the 16 images includes a moving subject, a region including the moving subject (moving region) appears as an artifact in the high-resolution combined images, without the resolution being increased (without experiencing a resolution-increasing effect).

Also in the low-resolution combined images, not only folding noise but also random noise is reduced by weighted addition and combining of the eight images in which the subject positions differ from one another. In the case where images acquired by the image acquisition unit 2 are used as-is to calculate feature quantities, it is difficult to calculate correlations accurately in regions that include a stationary subject (stationary region) and that suffer folding noise. On the other hand, by using the two low-resolution combined images with reduced folding noise and random noise, it is possible to correctly calculate correlations even in stationary regions suffering folding noise. In addition, because a moving subject appears in only one of the two low-resolution combined images or appears at positions different from each other in the two low-resolution images, it is possible to accurately determine a region including the moving subject (moving region) on the basis of a low correlation between the two low-resolution images.

A stationary region and a moving region can be accurately discriminated on the basis of such an accurate correlation. Therefore, it is possible to control the combining ratio appropriately so that the combining ratios of the high-resolution combined images are higher in a stationary region and so that the combining ratio of the enlarged base image is higher in a moving region. By doing so, the resolution-increasing effect resulting from a plurality of images being combined is retained in stationary regions regardless of whether folding noise occurs in the stationary regions, and a correction image in which artifacts are suppressed can be obtained in moving regions.

Figure 8:
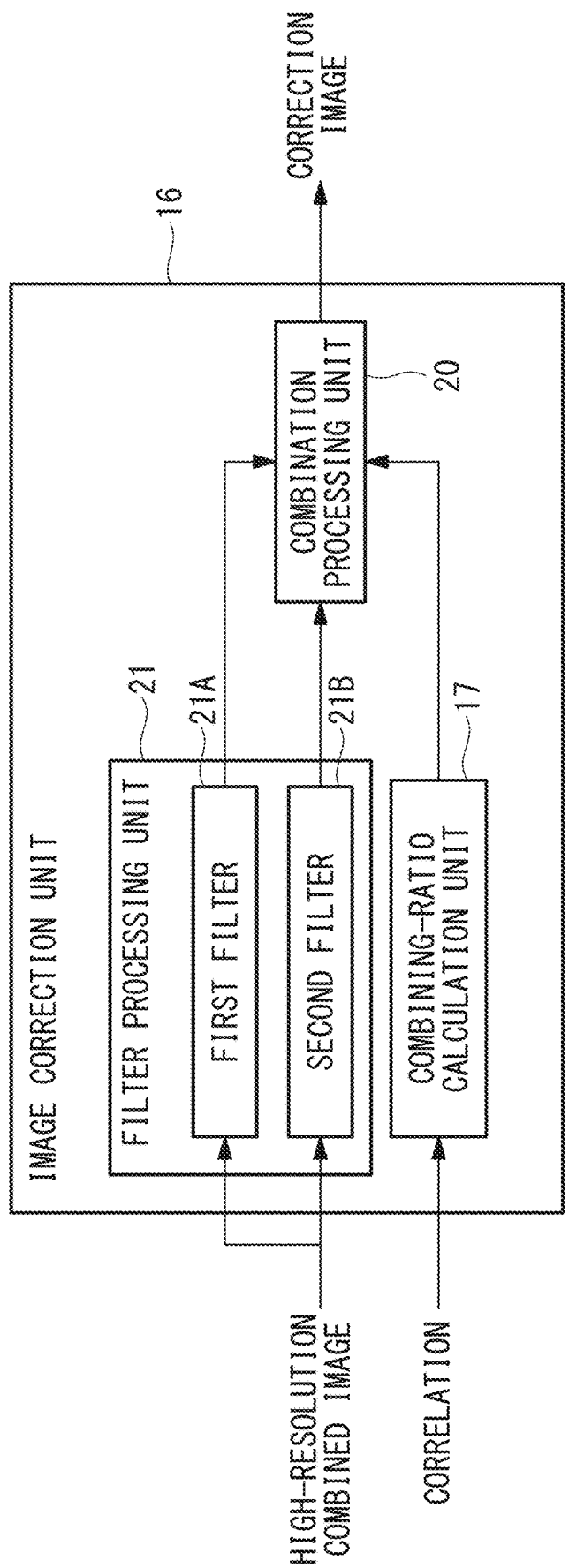
FIG. 8 is a block diagram showing an internal configuration of a modification of the image correction unit.

Although, in this embodiment, the image correction unit 16 corrects the high-resolution combined images by combining the high-resolution combined images and the enlarged base image, instead of this, the high-resolution combined images may be corrected by applying filter processing to the high-resolution combined images. More specifically, as shown in FIG. 8, the image correction unit 16 may include, instead of the color-interpolation processing unit 18 and the enlargement processing unit 19, a filter processing unit 21 having two types of low-pass filters 21A and 21B whose low-pass effects differ from each other.

FIG. 9 shows an example of the first filter 21A and the second filter 21B. As shown in FIG. 9, the first filter 21A has a filter coefficient exhibiting a weak low-pass characteristic, and the second filter 21B has a filter coefficient exhibiting a strong low-pass characteristic. The filter coefficients shown in FIG. 9 are just one example, and the filter coefficients can be set arbitrarily, as long as the first filter 21A has a characteristic that does not decrease the high resolution of the high-resolution combined images and the second filter 21B has a characteristic that naturally blurs a moving subject in the high-resolution combined images.

The high-resolution combined images are input to the filter processing unit 21 from the high-resolution combining unit 13. The filter processing unit 21 generates a first filter image, which is a sharp high-resolution combined image in which the high resolution is retained, by processing the high-resolution combined images by means of the first filter 21A. In addition, the filter processing unit 21 generates a second filter image, which is a blurred high-resolution combined image, by processing the high-resolution combined images by means of the second filter 21B. The two filter images are output from the filter processing unit 21 to the combination processing unit 20.

Figure 10:
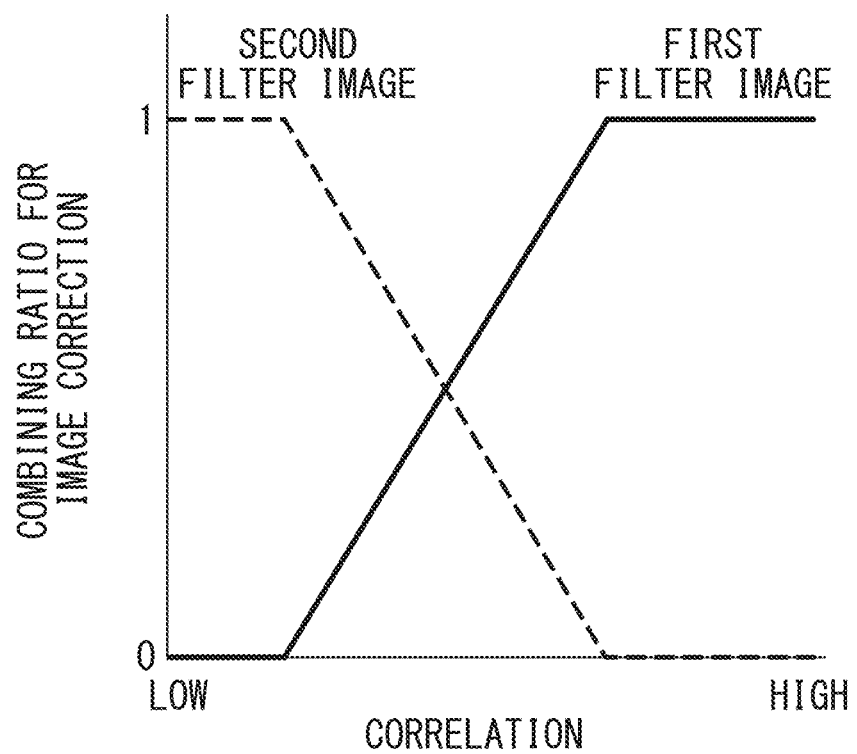
FIG. 10 is a diagram depicting one example of a map that is used when a combining ratio is calculated from a correlation in a combining-ratio calculation unit of the image correction unit in FIG. 8.

The combining-ratio calculation unit 17 includes a map in which correlations (SAD) serving as feature quantities and combining ratios are associated. FIG. 10 is shows one example of the map. In this manner, in the map, the higher the correlation, the higher the combining ratio of the first filter image, and the lower the correlation, the higher the combining ratio of the second filter image. The combining-ratio calculation unit 17 reads, from the map, a combining ratio corresponding to a feature quantity of each pixel of the high-resolution combined images and calculates a combining ratio between each of the high-resolution combined images and the base image at each pixel.

Figure 11:
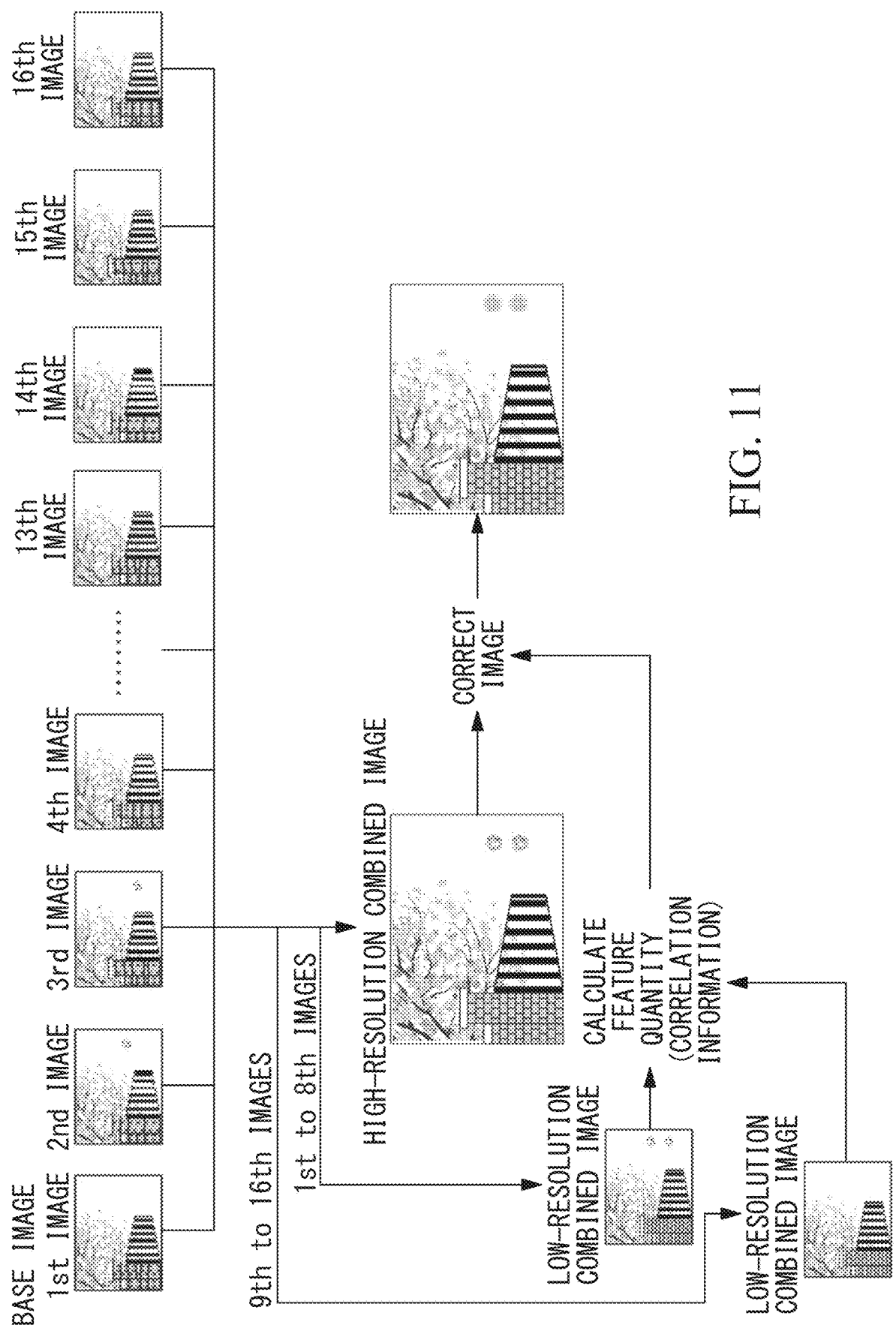
FIG. 11 is a schematic diagram for illustrating image processing with an image processing device including the image correction unit in FIG. 8.

The combination processing unit 20 combines the two filter images according to the combining ratios calculated by the combining-ratio calculation unit 17. More specifically, the combining ratio is controlled so that the sharp first filter image has a higher combining ratio in a stationary region, in which a higher correlation is achieved, and so that the blurred second filter image has a higher combining ratio in a moving region, in which a lower correlation is achieved. By doing so, as shown in FIG. 11, a correction image in which the stationary subject is sharp and the moving subject is subjected to blurring processing can be obtained.

Figure 12:
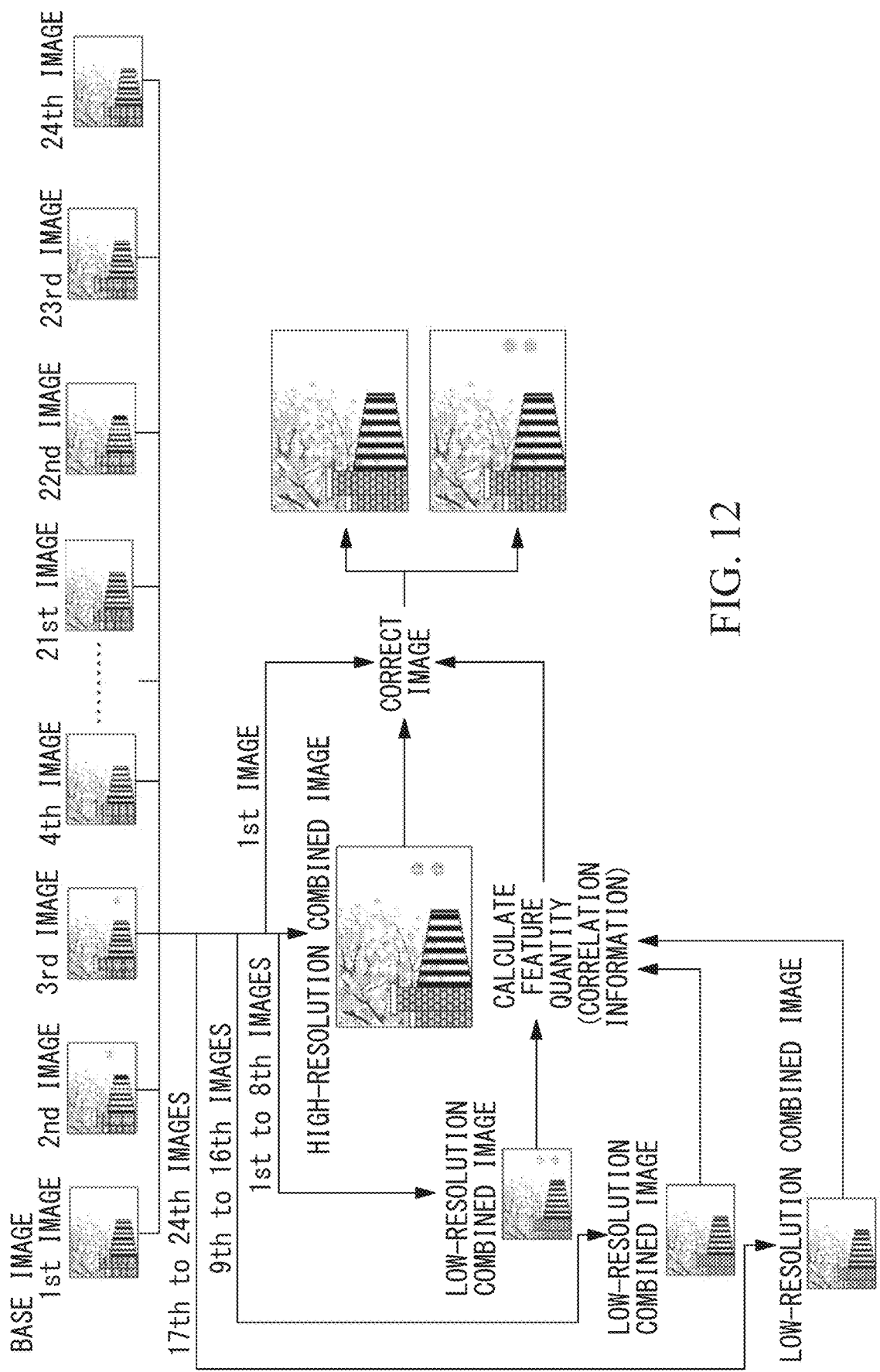
FIG. 12 is a schematic diagram for illustrating image processing with another modification of the image processing device in FIG. 1.

Although, in this embodiment, the low-resolution combining unit 14 generates two low-resolution combined images for the G channel, three or more low-resolution combined images for the G channel may be generated, as shown in FIG. 12.

FIG. 12 shows an example in which three low-resolution combined images are generated by dividing 24 time-series images into three groups in the time direction. More specifically, one low-resolution combined image is generated by using the first to eighth images, another low-resolution combined image is generated by using the second to 16th images, and still another low-resolution combined image is generated by using the 17th to 24th images.

In the feature-quantity calculation unit 15, the correlation between the first and second low-resolution images, the correlation between the second and third low-resolution images, and the correlation between the first and third low-resolution images are calculated for the pixels at the same positions. Therefore, the minimum value, the sum, or the mean of the three correlations is used as the feature quantity of each pixel.

By doing so, even more accurate feature quantities can be calculated by increasing the number of low-resolution combined images used to calculate the feature quantities, leading to even more accurate identification of a stationary region and a moving region in the high-resolution combined images on the basis of the feature quantities.

In this embodiment, the displacement detection unit 12 calculates the amount of displacement between images on the basis of the sensor shift control information from the sensor shift control unit 6 of the image acquisition unit 2. Instead of this, the displacement detection unit 12 may read the base image and the reference images from the frame memory 11 and calculate, as the amount of displacement, the amount of motion between the base image and each of the reference images. The amount of motion may be the amount of global motion of the entire image or the amount of local motion of each region. For example, an image may be divided into a plurality of blocks each composed of 32×32 pixels, and motion vectors in the horizontal direction and the vertical direction may be calculated for each of the blocks by using the block matching method or the like. The amount of motion may be not only the amounts of motion in the horizontal direction and vertical direction but also the amount of motion in the direction of rotation or a change in enlargement/reduction.

In successive acquisition of subject images, a plurality of images having the subject positions displaced relative to one another may be acquired as a result of the image capturing element 4 being shifted relative to the subject due to, for example, a camera shake or the like. In this manner, even in the case where the direction of shift and the amount of shift of the image capturing element 4 are unknown, the process of increasing the resolution by means of the image processing device 1 can be applied by detecting the amounts of displacement through image processing on the basis of images.

The image processing method according to this embodiment can be executed not only by the image processing device 1 composed of circuits but also by image processing programs. In this case, the image processing device 1 includes: a processor such as a CPU; a main storage device such as a RAM; and a computer-readable, non-temporary storage medium for storing an image processing program for realizing all or some of the above-described processes. The storage medium is a magnetic disk, a magneto-optical disk, a CD-ROM, a DVD-ROM, a semiconductor memory, or the like. The same processing as with the above-described image processing device 1 can be realized by reading the image processing programs from the storage medium to the main storage device and by causing the processor to process information and execute arithmetic operations according to the image processing programs.

As a result, the above-described embodiment leads to the following aspects.

An aspect of the present invention is an image processing device including: a high-resolution combining unit that aligns the plurality of images with each other in a high-resolution image space having a higher resolution than the plurality of images on the basis of the amount of displacement between the plurality of images, that combines the plurality of images, and that generates a high-resolution combined image; a low-resolution combining unit that generates at least two groups each composed of at least two images by dividing the plurality of images in the time direction, that aligns the at least two images in each of the groups with each other in a low-resolution image space having a resolution equal to or lower than the resolution of the plurality of images on the basis of the amount of displacement, that combines the at least two images through weighted addition, and that generates at least two low-resolution combined images; a feature-quantity calculation unit for calculating, in each region, a feature quantity pertaining to a correlation between the at least two low-resolution combined images generated by the low-resolution combining unit; and an image correction unit for correcting the high-resolution combined image on the basis of the feature quantity calculated by the feature-quantity calculation unit.

According to this aspect, in the high-resolution combining unit, the plurality of images are aligned with each other in the high-resolution image space and then combined, thus generating a high-resolution combined image in which folding noise in individual images has been removed. In the case where any of the plurality of images includes a moving subject, the high-resolution combined image suffers an artifact in a region including the moving subject (moving region).

On the other hand, in the low-resolution combining unit, the plurality of images used to generate the high-resolution combined image are divided into at least two groups, and the at least two images in each of the groups are aligned with each other in the low-resolution image space and then combined through weighted addition, thus generating at least two low-resolution combined images in which folding noise included in individual images has been removed. In the feature-quantity calculation unit, as a result of such at least two low-resolution combined images being used, a feature quantity pertaining to the correlation at each region between the low-resolution images is calculated without being affected by folding noise. A region may be composed of one pixel or may be composed of a plurality of pixels.

Therefore, in the image correction unit, a stationary region and a moving region can be accurately discriminated on the basis of the feature quantity, and appropriate image processing can be applied to each of the stationary region and the moving region in the high-resolution combined image. By doing so, it is possible to achieve both suppression of an artifact in the moving region and enhancement of the resolution in the stationary region suffering folding noise.

The above-described first aspect may include: a displacement detection unit for detecting the amount of motion between the plurality of images as the amount of displacement between the plurality of images.

By doing so, the amount of displacement between the plurality of images can be easily calculated.

In the above-described first aspect, the high-resolution combining unit may arrange each pixel of the plurality of images in the high-resolution image space on the basis of the amount of displacement.

By doing so, the high-resolution combined image can easily be generated.

In the above-described first aspect, the high-resolution combining unit may interpolate a pixel that is not arranged on the basis of information about pixels arranged in the high-resolution image space.

By doing so, a region that does not have a pixel arranged therein and that is present between pixels of one high-resolution combined image formed by combining the plurality of images through pixel arrangement can be filled with pixel information, thereby further increasing the resolution.

In the above-described first aspect, the low-resolution combining unit may arrange each pixel of the at least two images in the low-resolution image space on the basis of the amount of displacement.

By doing so, the low-resolution combined images can easily be generated.

In the above-described first aspect, the low-resolution combining unit may interpolate a pixel that is not arranged on the basis of information about pixels arranged in the low-resolution image space.

By doing so, a region that does not have a pixel arranged therein and that is present between pixels of one low-resolution combined image formed by combining the at least two images through pixel arrangement can be filled with pixel information, thereby further increasing the resolution.

In the above-described first aspect, the feature-quantity calculation unit may extend the resolution of the distribution of the feature quantities to the resolution of the high-resolution combined image.

By doing so, the spatial resolution of the feature quantities calculated by using the at least two low-resolution combined images can be made to coincide with the resolution of the high-resolution combined image, thereby facilitating correction in the image correction unit.

In the above-described first aspect, the image correction unit may apply low-pass filter processing to the high-resolution combined image such that the higher the correlation, the weaker the low-pass filter processing and such that the lower the correlation, the stronger the low-pass filter processing.

Because a motion or displacement of the subject is small in regions in which the correlation is high, a high resolution-increasing effect by combining the plurality of images can be produced in such regions. Therefore, the high resolution can be retained by applying weak low-pass filter processing to regions in which the correlation is high. On the other hand, because a motion or displacement of the subject is large in regions in which the correlation is low, an artifact is expected to occur in such regions. Therefore, in regions in which the correlation is low, blurring can be increased to suppress the occurrence of an artifact by applying strong low-pass filter processing to such regions.

In the above-described first aspect, the image correction unit may generate an enlarged image by enlarging one of the plurality of images to the same image size as the size of the high-resolution combined image and combine the high-resolution combined image and the enlarged image with a combining ratio based on the feature quantity.

By doing so, the enlarged image and the high-resolution combined image whose image sizes match can be easily combined.

In the above-described first aspect, the image correction unit may set the combining ratio such that the higher the correlation, the higher the combining ratio of the high-resolution combined image and such that the lower the correlation, the higher the combining ratio of the enlarged image.

By doing so, the resolution-increasing effect can be further increased in regions in which the correlation is high, and the artifact-suppressing effect due to blurring of the subject can be further increased in regions in which the correlation is low.

Another aspect of the present invention is an image capturing device including: an image acquisition unit for acquiring a plurality of time-series images; and one of the above-described image processing devices for processing the plurality of images acquired by the image acquisition unit.

In the above-described second aspect, the image acquisition unit may include: an image capturing element; a sensor shift mechanism for shifting the position of the image capturing element in a pixel arrangement direction of the image capturing element; and a sensor shift control unit for controlling the direction of shift and the amount of shift of the image capturing element performed by the sensor shift mechanism.

By doing so, the plurality of images in which the subject positions are displaced from each other are acquired as a result of the sensor shift mechanism displacing the position of the image capturing element relative to the subject according to the direction of shift and the amount of shift controlled by the sensor shift control unit.

The above-described second aspect may include: a displacement detection unit for calculating the amount of displacement on the basis of the direction of shift and the amount of shift of the image capturing element controlled by the sensor shift control unit.

By doing so, the amount of displacement between the plurality of images can be calculated more easily.

Another aspect of the present invention is an image processing method for combining a plurality of time-series images in which subject positions are displaced from each other and generating an image having a higher resolution than the plurality of images, the method including: a high-resolution combining step of aligning the plurality of images with each other in a high-resolution image space having a higher resolution than the plurality of images on the basis of the amount of displacement between the plurality of images, combining the plurality of images, and generating a high-resolution combined image; a low-resolution combining step of generating at least two groups each composed of at least two images by dividing the plurality of images in the time direction, aligning the at least two images in each of the groups with each other in a low-resolution image space having a resolution equal to or lower than the resolution of the plurality of images on the basis of the amount of displacement, combining the at least two images through weighted addition, and generating at least two low-resolution combined images; a feature-quantity calculation step of calculating, in each region, a feature quantity pertaining to a correlation between the at least two low-resolution combined images generated in the low-resolution combining step; and an image correction step of correcting the high-resolution combined image on the basis of the feature quantity calculated in the feature-quantity calculation step.

Another aspect of the present invention is an image processing program for causing a computer to execute image processing for combining a plurality of time-series images in which subject positions are displaced from each other and generating an image having a higher resolution than the plurality of images, the program including: a high-resolution combining step of aligning the plurality of images with each other in a high-resolution image space having a higher resolution than the plurality of images on the basis of the amount of displacement between the plurality of images, combining the plurality of images, and generating a high-resolution combined image; a low-resolution combining step of generating at least two groups each composed of at least two images by dividing the plurality of images in the time direction, aligning the at least two images in each of the groups with each other in a low-resolution image space having a resolution equal to or lower than the resolution of the plurality of images on the basis of the amount of displacement, combining the at least two images through weighted addition, and generating at least two low-resolution combined images; a feature-quantity calculation step of calculating, in each region, a feature quantity pertaining to a correlation between the at least two low-resolution combined images generated in the low-resolution combining step; and an image correction step of correcting the high-resolution combined image on the basis of the feature quantity calculated in the feature-quantity calculation step.

Another aspect of the present invention is a non-temporary computer-readable storage medium for storing an image processing program for causing a computer to execute image processing for combining a plurality of time-series images in which subject positions are displaced from each other and generating an image having a higher resolution than the plurality of images, the image processing program including: a high-resolution combining step of aligning the plurality of images with each other in a high-resolution image space having a higher resolution than the plurality of images on the basis of the amount of displacement between the plurality of images, combining the plurality of images, and generating a high-resolution combined image; a low-resolution combining step of generating at least two groups each composed of at least two images by dividing the plurality of images in the time direction, aligning the at least two images in each of the groups with each other in a low-resolution image space having a resolution equal to or lower than the resolution of the plurality of images on the basis of the amount of displacement, combining the at least two images through weighted addition, and generating at least two low-resolution combined images; a feature-quantity calculation step of calculating, in each region, a feature quantity pertaining to a correlation between the at least two low-resolution combined images generated in the low-resolution combining step; and an image correction step of correcting the high-resolution combined image on the basis of the feature quantity calculated in the feature-quantity calculation step.

The present invention affords an advantage in that when a higher-resolution image is to be combined from a plurality of images, it is possible to achieve both suppression of artifacts in regions including a moving subject and enhancement in the resolution in regions that include a stationary subject and that suffer folding noise.

REFERENCE SIGNS LIST

1 Image processing device
2 Image acquisition unit
3 Image capturing lens
4 Image capturing element
5 Sensor shift mechanism
6 Sensor shift control unit
10 Image capturing device
11 Frame memory
12 Displacement detection unit
13 High-resolution combining unit
14 Low-resolution combining unit
15 Feature-quantity calculation unit
16 Image correction unit
17 Combining-ratio calculation unit
18 Color-interpolation processing unit
19 Enlargement processing unit
20 Combination processing unit
21 Filter processing unit
21A First filter
21B Second filter

The invention claimed is:
1. An image processing device comprising:
one or more processors comprising hardware, the one or more processors being configured to:
generate a high-resolution combined image by aligning a plurality of time-series images with each other in a high-resolution image space having a resolution higher than the plurality of time-series images based on an amount of displacement between the plurality of time-series images, and combining the plurality of time-series images;
generate at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition;
calculate, in each region, a feature quantity pertaining to a correlation between the generated at least two low-resolution combined images; and
correct the high-resolution combined image based on the calculated feature quantity.

2. The image processing device according to claim 1, wherein the one or more processors are configured to detect an amount of motion between the plurality of time-series images as the amount of displacement between the plurality of time-series images.

3. The image processing device according to claim 1, wherein the generating of the high-resolution combined image comprises arranging each pixel of the plurality of time-series images in the high-resolution image space based on the amount of displacement.

4. The image processing device according to claim 3, wherein the generating of the high-resolution combined image comprises interpolating a pixel that is not arranged based on information about pixels arranged in the high-resolution image space.

5. The image processing device according to claim 1, wherein the generating of the at least two low-resolution combined images comprises arranging each pixel of the at least two images in the low-resolution image space based on the amount of displacement.

6. The image processing device according to claim 5, wherein the generating of the at least two low-resolution combined images comprises interpolating a pixel that is not arranged based on information about pixels arranged in the low-resolution image space.

7. The image processing device according to claim 1, wherein the calculating of the feature quantity comprises calculating, as the feature quantity, a correlation in each region between the at least two low-resolution combined images.

8. The image processing device according to claim 7, wherein the calculating of the feature quantity comprises extending a resolution of distribution of the feature quantities to the resolution of the high-resolution combined image.

9. The image processing device according to claim 7, wherein the correcting of the high-resolution combined image comprises applying low-pass filter processing to the high-resolution combined image such that the higher the correlation, the weaker the low-pass filter processing and such that the lower the correlation, the stronger the low-pass filter processing.

10. The image processing device according to claim 1, wherein the correcting of the high-resolution combined image comprises generating an enlarged image by enlarging one of the plurality of time-series images to a same image size as a size of the high-resolution combined image and combines the high-resolution combined image and the enlarged image with a combining ratio based on the feature quantity.

11. The image processing device according to claim 10, wherein the correcting of the high-resolution combined image comprises setting the combining ratio such that the higher the correlation, the higher the combining ratio of the high-resolution combined image and such that the lower the correlation, the higher the combining ratio of the enlarged image.

12. An image capturing device comprising:
an image acquisition unit that is configured to acquire a plurality of time-series images; and
the image processing device according to claim 1 for processing the acquired plurality of time-series images.

13. The image capturing device according to claim 12, wherein the image acquisition unit includes:
an image capturing element;
a sensor shift mechanism that is configured to shift a position of the image capturing element in a pixel arrangement direction of the image capturing element; and
a sensor shift controller that is configured to control a direction of shift and an amount of shift of the image capturing element performed by the sensor shift mechanism.

14. The image capturing device according to claim 13, wherein the one or more processors are configured to calculate the amount of displacement based on the direction of shift and the amount of shift of the image capturing element controlled by the sensor shift control unit.

15. An image processing method comprising:
generating, by one or more processors, a high-resolution combined image by aligning a plurality of time-series images with each other in a high-resolution image space having a resolution higher than the plurality of time-series images based on an amount of displacement between the plurality of time-series images, and combining the plurality of time-series images;
generating, by the one or more processors, at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition;
calculating, by the one or more processors, in each region, a feature quantity pertaining to a correlation between the generated at least two low-resolution combined images; and
correcting, by the one or more processors, the high-resolution combined image based on the calculated feature quantity.

16. A non-transitory computer-readable storage medium storing an image processing program for causing a computer to execute processes comprising:
generating a high-resolution combined image by aligning a plurality of time-series images with each other in a high-resolution image space having a resolution higher than the plurality of time-series images based on an amount of displacement between the plurality of time-series images, and combining the plurality of time-series images;
generating at least two low-resolution combined images by generating at least two groups each composed of at least two images by dividing the plurality of time-series images in the time direction, aligning the at least two images in each of the groups with each other in a low-resolution image space having a resolution equal to or lower than the resolution of the plurality of time-series images based on the amount of displacement, and combining the at least two images through weighted addition;

calculating, in each region, a feature quantity pertaining to a correlation between the generated at least two low-resolution combined images; and correcting the high-resolution combined image based on the calculated feature quantity.

17. The image processing device according to claim 4, wherein the generating of the at least two low-resolution combined images comprises arranging each pixel of the at least two images in the low-resolution image space based on the amount of displacement.

\* \* \* \* \*